United States Patent
Novik et al.

(10) Patent No.: US 9,870,410 B2
(45) Date of Patent: Jan. 16, 2018

(54) CONSTRUCTED DATA STREAM FOR ENHANCED EVENT PROCESSING

(71) Applicant: MICROSOFT CORPORATION, Redmond, WA (US)

(72) Inventors: Lev Novik, Bellevue, WA (US); Olivier Nano, Munich (DE); Ivo Jose Garcia Dos Santos, Munich (DE); Laurent Bussard, Strasbourg (FR); Alex Raizman, Redmond, WA (US); Dipanjan Banik, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 14/486,638

(22) Filed: Sep. 15, 2014

(65) Prior Publication Data

US 2016/0078103 A1 Mar. 17, 2016

(51) Int. Cl.
*G06F 17/30* (2006.01)

(52) U.S. Cl.
CPC .. *G06F 17/30554* (2013.01); *G06F 17/30551* (2013.01)

(58) Field of Classification Search
CPC ......... G06F 17/30551; G06F 17/30554; G06F 17/30; G06F 17/30563; G06F 17/3082; G06F 17/30861; G06F 17/30899; G06F 3/017; G06F 3/04815; G06F 9/465
See application file for complete search history.

(56) References Cited

U.S. PATENT DOCUMENTS

| | | | |
|---|---|---|---|
| 8,620,716 B2 | 12/2013 | Nicholls et al. | |
| 2006/0282474 A1 | 12/2006 | MacKinnon, Jr. | |
| 2014/0095541 A1 | 4/2014 | Herwadkar et al. | |
| 2014/0101093 A1 | 4/2014 | Lanphear et al. | |
| 2015/0363464 A1* | 12/2015 | Alves ................ | G06F 17/30448 707/765 |

OTHER PUBLICATIONS

"Second Written Opinion Issued in PCT Application No. PCT/US2015/049876", dated Jul. 4, 2016, 6 Pages.

(Continued)

*Primary Examiner* — Truong Vo
(74) *Attorney, Agent, or Firm* — Shook, Hardy & Bacon L.L.P.

(57) ABSTRACT

Embodiments described herein are directed to methods and systems for enhanced event processing. An enhanced event processing request is received, the enhanced processing request comprising an indication of input data from a database data source. The input data indicated in the enhanced event processing request is accessed using a constructed data stream. The constructed data stream provides access to a collection of snapshots over time of database data of the database data source. The data from constructed data stream source may be accessed as a function of a selected value and a selected time. The constructed data stream data includes the temporal element, which is unavailable with the database data, the temporal element facilitates performing enhanced event processing for the database data using the constructed data stream data. An output for the enhanced event processing request is generated based on the input data accessed using the constructed data stream data.

20 Claims, 5 Drawing Sheets

(56) References Cited

OTHER PUBLICATIONS

Varma, Anuj, "Getting Started With Microsoft StreamInsight", Retrieved from <<http://www.anujvarma.com/getting-started-with-microsoft-streaminsight/>>, Apr. 24, 2012, 6 Pages.

"International Preliminary Report on Patentability Issued in PCT Application No. PCT/US2015/049876", dated Oct. 11, 2016, 6 Pages.

Eckert, Michael, "Complex Event Processing with XChangeEQ: Language Design, Formal Semantics, and Incremental Evaluation for Querying Events", In Dissertation, Oct. 22, 2008, 301 pages.

Cao, et al., "High Performance Stream Query Processing With Correlation Aware Partitioning", In Proceedings of the VLDB Endowment, Dec. 2013, pp. 265-276.

Bhargavi, et al., "Semantic Intrusion Detection with Multisensor Data Fusion using Complex Event Processing", In Proceedings of Sadhana, vol. 38, Part 2, Apr. 2013, pp. 169-185.

Cugola, et al., "Processing Flows of Information: From Data Stream to Complex Event Processing", In ACM Computing Surveys (CSUR), vol. 44, Issue 3, Jun. 2012, pp. 15:1-15:62.

Carbone, et al., "Towards Highly Available Complex Event Processing Deployments in the Cloud", In Seventh International Conference on Next Generation Mobile Apps, Services and Technologies, Sep. 28, 2013, pp. 153-158.

"Esper—Event Stream and Complex Event Processing for Java", Published on: Oct. 11, 2011, Available at: http://esper.codehaus.org/esper-4.0.0/doc/reference/en/html_single/.

Barga, et al., "Event Correlation and Pattern Detection in CEDR", In Proceedings of International Conference on Current Trends in Database Technology, Mar. 26, 2006, 4 pages.

"Enabling Organizations to Derive Insights from Streaming Information in Near Real-Time", Retrieve on: Jul. 14, 2014, Available at: https://www.google.com/url?sa=t&rct=j&q=&esrc=s&source=web&cd=1&cad=rja&uact=8&ved=0CB4QFjAA&url=http%3A%2F%2Fdownload.microsoft.com%2Fdownload%2F7%2FB%2F8%2F7B8525F3-A999-45DA-9BCA-ACFBD6618A41%2FStreamInsight_Datasheet.

Textor, et al., "An Architecture for Semantically Enriched Data Stream Mining", In Proceedings of the First International Conference on Data Analytics, Sep. 2012, pp. 107-113.

"International Search Report and Written Opinion Issued in PCT Application No. PCT/US2015/049876", dated Feb. 5, 2016, 11 Pages.

Grabs, et al., "Introducing Microsoft StreamInsight", Retrieved from <<http://download.microsoft.com/download/f/d/5/fd5e855c-d895-45a8-9f3e-110afadbe51a/microsoft%20cep%20overview.docx>>, Sep. 2009, 27 Pages.

Ali, et al., "The Extensibility Framework in Microsoft StreamInsight", In Proceedings of the IEEE 27th International Conference on Data Engineering, Apr. 11, 2011, pp. 1242-1253.

\* cited by examiner

CONSTRUCTED DATA STREAM FOR ENHANCED EVENT PROCESSING

BACKGROUND

Event processing refers to tracking and analyzing streams of information to derive a conclusion from them. Streams of information may be, in particular, about events. Event processing also includes event processing that combines data from multiple data sources to infer events or patterns that suggest more complicated circumstances. As such, event processing can facilitate identifying meaningful events and respond to them as quickly as possible.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to methods, systems, and computer storage media for enhanced event processing. An enhanced event processing request may be received, the enhanced processing request comprising an indication of input data from a database data source to be used to derive output data. The input data indicated in the enhanced event processing request is accessed using a constructed data stream source not the database data source. The constructed data stream data source provides access to a collection of snapshots over time of database data of the database data source. The data from constructed data stream source may be accessed as a function of a selected value and a selected time. The constructed data stream data comprises a temporal element. The constructed data stream data includes the temporal element, which is unavailable at the database data, the temporal element facilitates performing enhanced event processing for the database data using the constructed data stream data. An output for the enhanced event processing request is generated based on the input data accessed using the constructed data stream data.

Enhanced event processing may further include combining a data stream source and a constructed data stream source, the constructed data stream source acting as a proxy for a database data source. An enhanced event processing request can include both a first indication of input data from a database data source and a second indication of input from a data stream source. In this regard, the input data indicated in the first indication of input data can be accessed via the constructed data stream source and the input data indicated in the second indication can be accessed via the data stream source. The input data are combined and correlated using a first temporal element of the constructed data stream and a second temporal element of the data stream to generate a derived output for the enhanced event processing request. In embodiments, a validity time mechanism provides routines and procedures for indicating un-contradicted outputs for enhanced event processing requests. Specifically, a validity temporal element indicates a time where the output based on one or more data sources accurately reflects that data in the data source at that time.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments are described with reference to provisioning in-rack hardware inventory in a data center and by way of example, provisioning hardware inventory in advance of bootstrapping. However, the provisioning workflow may be used for provisioning new in-rack hardware inventory for a variety of different types of hardware services and datacenter bootstrapping is merely exemplary. It is contemplated that the techniques described may be extended to other implementation contexts.

Event processing refers to tracking and analyzing streams of information to derive a conclusion from them. Streams of information may be, in particular, about events. Event processing also includes event processing that combines data from multiple data sources to infer events or patterns that suggest more complicated circumstances. As such, event processing can facilitate identifying meaningful events (e.g., opportunities or threats) and respond to them as quickly as possible. Events may generally include sales leads, orders or customer service call, new items, text messages, social media posts, stock market feeds, traffic reports, weather reports, internet of things data, or other kinds of data.

Event processing data source can include digitized data in a data streams and databases. In an exemplary scenario, processing data streams can include filtering out or aggregating events based on identified criteria. Other types of processing can be performed based on different events. Event processing can also be based on analyzing multiple incoming data sets from different data stream sources.

An event processing data source may also be a database. A database is an organized collection of data. The data are typically organized to model aspects of reality in a way that supports processes requiring. For example, modeling customer transactions in a way that supports knowing who the customer is and where the customer lives (e.g., customer name, customer address). A database management system maintains database tables (e.g., relational database tables) in software applications that interact with users and other applications to capture and analyze data.

Database data may in particular include reference data that include a set of related or categorized global data. Reference data may be data associated with an event that is stored in a database table. Reference data can be available at trusted public domains or from premium commercial content providers. Reference data can also include a set of permissible values to be used by other data fields.

Interacting with database tables can be performed using a declarative framework that utilizes a logic intrinsically associated with the database tables. The declarative framework may minimize describing control flow (i.e., the order in which individual statements, instructions or function calls are executed). In this regard, interacting with the database tables may be facilitated by simply indicating what data is needed from the database tables and not how to go about getting the data from the tables. By way of example, SQL (Structured Query Language) may be used for managing data held in relational databases.

Database data including reference data do not model stream events. For example, database data is not configured as temporal data (e.g., a temporal element such as time), thus data stream operations that rely on temporal elements of events of the data stream cannot be performed on database data. As such, event processing operations based on a database data or the combination of database data and data stream data can advantageously utilize a different framework for enhancing event processing requests associated with a database data source alone or in combination with a data stream source. Without a framework that defines the enhanced event processing of database data, data streams, and combinations thereof, operations that can be performed on data streams cannot be performed on database data, thus limiting the capacity for inferring events and patterns from these two data sources.

Alternative solutions may include actively tracking of time stamps for data entries in a database. For example, a start time and an end time for each data entry in the database. However, such implementations usually become very expensive because of the additional amount of data that needs to be stored and in turn reduce the efficiencies of relational databases. Additionally, alternate solutions are not simple turnkey solutions and lack backwards compatibility because the logic for the event processing using database data is not configured to work with the database data in a state in which the data was captured in the database tables. At times, database tables may have to completed ported in order to implement event processing with the database data.

Accordingly, embodiments of the present invention provide simple and efficient methods and systems for enhanced event processing based on a constructed data stream source. An enhanced event processing request may be generated and communicated to derive output data. The enhanced event processing request indicates input data to be accessed from a database data source. Enhanced event processing provides for accessing the input data using a constructed data stream source. The constructed data stream source provides access to a collection of snapshots of the database data taken over time such that data from constructed data stream source may be accessed as a function of a selected value and a selected time.

The input data is accessed as a constructed data stream having a temporal element. The constructed data stream data includes the temporal element, which is unavailable at the database data source, the temporal element facilitates performing enhanced event processing for the database data using the constructed data stream. As such, data stream operations that could not be performed using the database data can be performed using the constructed data stream data instead. An output for the enhanced event processing request is generated based on the constructed data stream data. The constructed data stream can be used to perform use to perform a look up request based on a selected value and a selected time. In this regard, the constructed data stream can be used to pull database data based on queries.

Enhanced event processing may further include combining at least one data stream source and at least one constructed data stream source, the at least one constructed data stream source acting as a proxy for database data source. In this regard, an enhanced event processing request can include both a first indication of input data (e.g., reference data) from a database data source and a second indication of input data (e.g., event data) from a data stream source. The input data indicated in the first indication of input data can be accessed via the constructed data stream source and the input data indicated in the second indication can be accessed via the data stream source. The input data are combined and correlated using a first temporal element of the constructed data stream data and a second temporal element of the data stream data to generate a derived output for the enhanced event processing request. The data stream and the constructed data stream can be more easily correlated in performing event processing operations.

Event processing with a constructed data stream is configured to guarantee repeatability. Repeatability or repeatable computation refers to re-executing event processing analysis at a later time with the same data source and generating the same results. For example, a query executed on a live data stream at a first time produces the exact same result when executed at a second time after the first time. With a constructed data stream and a data stream, a query combining input data from both streams produces the same results even the database data which the constructed data stream is generated from has been altered. In operation, a temporal element (e.g., application time) is identified to correspond with database data to generate constructed data stream. The constructed data stream comprises sampled snapshots of the database data such that the constructed data stream having a temporal element can be accessed to execute an entered query. With repeatability, event processing can include making comparison between queries that are executed against the same input data. The queries may be compared to evaluate and optimize the nature of the query, construct alternate versions of the query to generate an improved query, compare results between variations of the query, or run an alternate version of the query to get more information.

The enhanced event processing framework ("enhanced framework") further includes constructed data stream and additional modules/components and mechanisms (e.g., routines and procedures) that provide a support system for implementing event processing based on a data stream and database data as a constructed data stream. In embodiments, a validity time mechanism provides routines and procedures for indicating un-contradicted outputs for enhanced event processing requests. Specifically, a validity temporal element indicates a time where the output based on one or more data sources accurately reflected that data in the data source at that time. In this regard, embodiments described herein can advantageously allow for historical queries while maintaining validity and performance of time state queries.

Various terms are used throughout this description. Although more details regarding various terms are provided throughout this description, general definitions of some terms are included below to provider a clearer understanding of the ideas disclosed herein:

An enhanced event processing request refers to a request having one or more inputs that include at least database data that is not associated with a temporal element but instead accessed using a constructed data stream having a temporal element. Enhanced event processing may also include inputs for both database data and a data stream that are combined to generate an output.

Database data refers to an organized collection of data. Database data may in particular include reference data that include a set of related or categorized global data. The database data may not have temporal element associated with the data in the database. The temporal element as used herein may refer to a particular time when an event associated with an entry in a database table occurred.

Data stream refers digitized data in data streams. Event processing can be based on analyzing multiple incoming data sets from different data stream sources. As such, event processing can facilitate identifying meaningful events (e.g., opportunities or threats) and respond to them, as quickly as possible. Events may generally include sales leads, orders or customer service call, new items, text messages, social media posts, stock market feeds, traffic reports, weather reports, internet of things data, or other kinds of data.

A constructed data stream refers to data that is generated from database data as a collection of snapshots over time. Constructed data stream is associated with a temporal element as such the constructed data stream source may be accessed as a function of a selected value and a selected time. The constructed data stream can be accessed as a data stream with temporal elements and also accessed using a lookup mechanism the pulls data from the constructed data stream based on a query.

Temporal element refers to a particular time when an event occurred. A temporal element may be associated with an event that is entered into a database where the temporal element in not preserved. A temporal element may be associated with data stream event. A temporal element may also be associated with a constructed data stream event that is derived from when the event occurred and preserved as part of a snapshot of the database data. A constructed data stream may also be associated multiple temporal elements such that the constructed data stream supports bi-temporal joins as discussed in more detail below.

Accordingly, in a first embodiment described herein, a computer-implemented method for enhanced event processing is provided. The method comprises receiving an enhanced event processing request. The enhanced event processing request comprises an indication of input data from a database data source. The method further includes accessing the input data indicated in the indication of input data using a constructed data stream source, wherein the constructed data stream source provides access to a collection of snapshots over time. The input data is accessed using the constructed data stream source that includes a temporal element. The method also includes generating an output for the enhanced event processing request based on the input data accessed using the constructed data stream.

In a second embodiment described herein, one or more computer storage media storing computer-useable instructions that, when used by one or more computing devices, causes the one or more computing devices to perform a method for enhanced event process is provided. The method includes identifying a database data source. The method further includes sampling at least a portion of a database data of the database data source to generate one or more snapshots of the database data. The method also includes generating a constructed data stream based on the one or more snapshots of the database data. The constructed data stream is associated with a temporal element. The method further includes providing access to constructed data stream based on an enhanced event processing request; wherein the enhanced processing event request is associated with an indication of input data in a database of the database data source accessible using the constructed data stream.

In a third embodiment described herein, a computer system for performing enhanced event processing is provided. The system comprises a database data source component configured for providing access to a database data. The system includes a constructed data stream source component configured for: identifying a database data source; sampling at least a portion of a database data of the database data source to generate one or more snapshots of the database data; generating a constructed data stream based on the one or more snapshots of the database data, wherein the constructed data stream is associated with a temporal element; and providing access to the constructed data stream based on an enhanced event processing request. The enhanced processing event request is associated with at least an indication of input data in the database of the database data source accessible using the constructed data stream. The system also includes a data stream source configured for: providing access to data stream.

The system includes an event processing server configured for: receiving the enhanced event processing request, the enhanced event processing request comprises an indication of input data from the database data source and a second indication of input data from the data stream; accessing the input data in the indication of input data using the constructed data stream source, the constructed data stream source provides access to a collection of snapshots, of database data of the database data source, over time, the input data is accessed using the constructed data stream that comprises a first temporal element; accessing input data in the second indication of input data using the data stream source; correlating a first temporal element of the constructed data stream with a second temporal element of the of the data stream; and generating an output for the enhanced event processing request based on the input data of the constructed data stream and the input data of the data stream.

Figure 1:
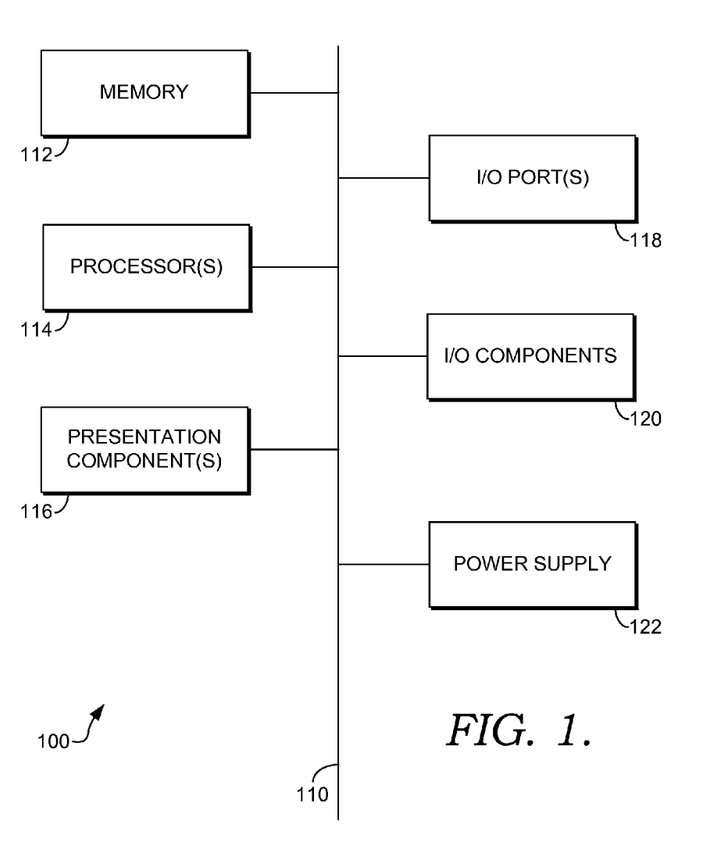
FIG. 1 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
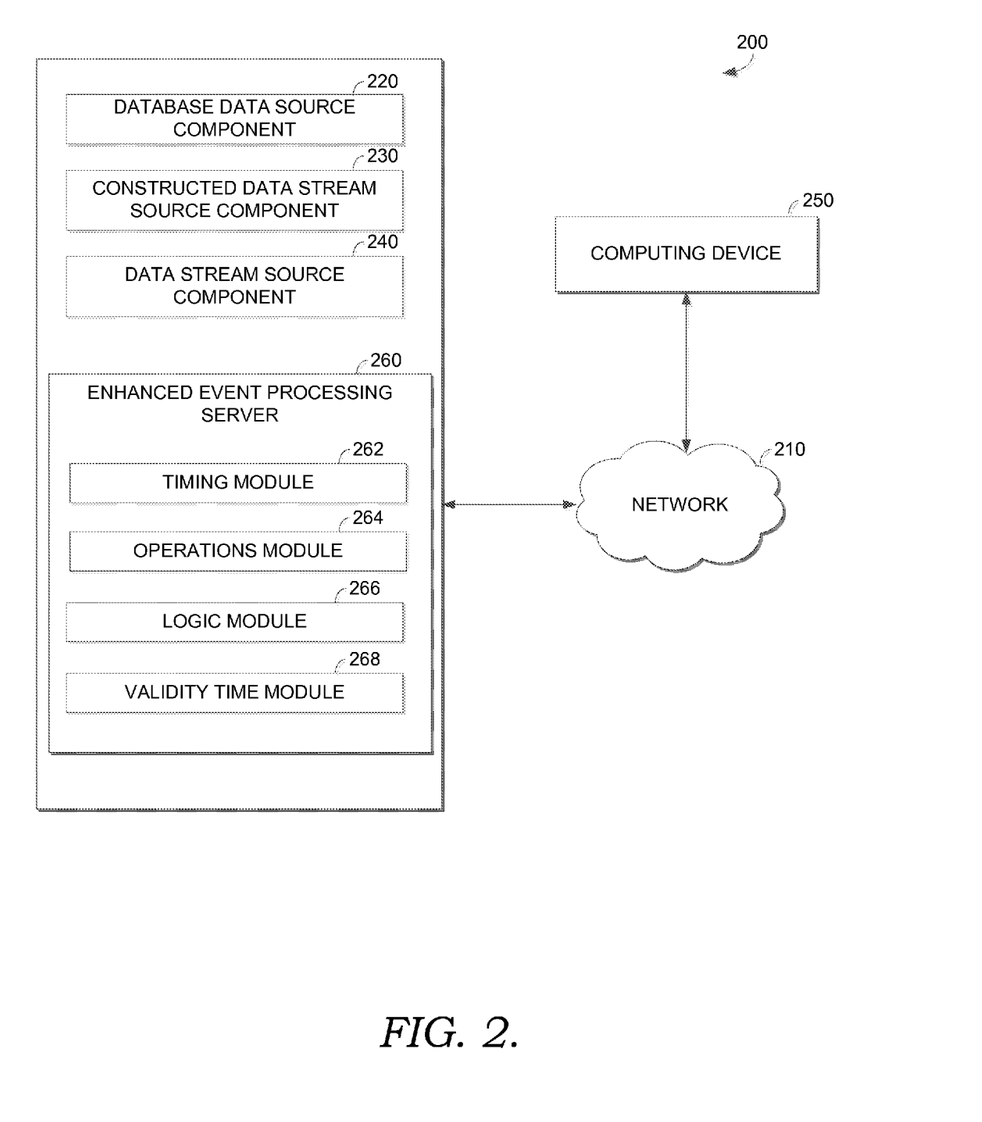
FIG. 2 is a block diagram of an exemplary operating environment in which embodiments described herein may be employed.

Turning now to FIG. 2, a block diagram depicting an exemplary enhanced event processing system 200 suitable for use in implementing embodiments described herein. Generally, the system 200 illustrates an operating environment that may be used for, among other things, performing enhanced event processing. Enhanced event processing may be associated with event processing requests indicating input data from at least a database data source.

Among other components not shown, the system 200 may generally include a database data source component 220, a constructed data stream source component 230, a data stream source component 240, a computing device 250, and an enhanced event processing server 260 all in communication with one another via a network 270. The network 210 may include, without limitation, one or more local area networks (LANs) and/or wide area networks (WANs). Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the enhanced event processing server 260. It will be understood by those of ordinary skill in the art that the components and modules illustrated in FIG. 2 are exemplary in nature and in number and should not be construed as limiting. Any number of components and/or modules may be employed to achieve the functionality described herein. For example, any number of computing devices, database data source components, constructed data stream source components, data stream source components, computing devices, enhanced event processing servers and networks may be employed in the system 200 within the scope of embodiments hereof. Each may comprise a single device/interface or multiple devices/interfaces cooperating in an operating environment. For instance, multiple devices and/or modules arranged in a distributed environment may collectively provide the enhanced event processing sever 260 functionality described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the system 200, may be carried out by a processor executing instructions stored in memory.

Turning now to the various components that may be included in the system 200, database data source component 220 is responsible for storing and providing access to database data. The database data source component can store data in a database having relational database tables. The database data may not have temporal elements associated with the data in the database. The temporal element as used herein may refer to a particular time when an event associated with an entry in a database table occurred. For example, for a customer, a first transaction may capture a first address of the customer. The customer may perform a second transaction at a second time and then update the first address with a new second address of a customer. As such, the database updates the customer address without regard for a temporal element. The database tables include records that change overtime based on new information that is recorded without regard for a time associated with the previous entry or the new entry. In this regard, the data requests (e.g., queries) to the database data component are not repeatable as the data changes over time. Repeatable computation refers to re-executing event processing analysis at a later time with the same data source and generating the same results.

Additionally, the database data component can support operations that do not include temporal elements. A query for customer address information provides customer address information of the customer at the time the query is executed. An operation to find out customer address information specifically at a time of the first transaction or during the second transaction is not supported as the database table merely records the most up-to-date customer address information associated with a transaction.

In an exemplary embodiment, the database data source component 220 may provide access to a database that supports an administrative temporal element. The administrative temporal element refers to a temporal element (e.g., time) used for operation-based functionality (e.g., auditing, maintenance, and provisioning) of the database data. In databases having administrative temporal element, the administrative temporal elements are not intended to be recorded in the database tables. However, the administrative temporal element may be used to as part of a notification mechanism that informs one or more external components of a change in the database data. The notification mechanism may further implement a batching feature where the batching feature can determine a predetermined number of changes or determine a predetermined period of time before triggering a notification to perform sampling of the database data. As such, even though the intended nature of administrative temporal element may be that the administrative temporal element is fleeting and not recorded, the temporal element can be used in generating a constructed data stream. It is contemplated that a constructed data stream source component may have a subscription mechanism for receiving notifications of changes in the database data and generating the constructed data stream using sampling that creates differential snapshots, as discussed in more detail below.

It is further contemplated that the database data source component 220 may have been developed prior to identifying an enhanced event processing logic for processing the data in the database data component in using event processing either alone or in an integrated manner with a data stream source. In this regard, the database data source component 220 may not include any features specifically associated with a selected logic for enhanced event processing. In other words, enhanced event processing logic in embodiments described herein are configured to function with legacy systems or to be backwards compatible with a database that is developed independently of the enhanced event processing logic, as discussed in more detail below.

The constructed data stream source component 230 is responsible for managing and providing access to a constructed data stream. The constructed data stream is generated such that is can be accessed based on a value and time associated with the database data. In this regard, the constructed data stream is a function of a value and a temporal element. The constructed data stream is associated with the database data based on the value and the temporal element of the data. It is contemplated a key attribute or set of attributes may be used to guarantee an entry exists for the database data to be constructed into a data stream.

The constructed data stream preserves snapshots for a given duration in order to enable repeatability. When joining a data stream with database data, the constructed data stream snapshot can be defined by a temporal element (e.g., timestamp of application time) of the data stream (e.g., live data stream). The database data does not manage relational tables with a notion of time, but an administrative temporal element (e.g., commit times of a database system) as a time associated with database data that is sampled to generate a snapshot. In this regard, the database data source in order to support snapshotting with a commit time as sync time, the database data can be accessible as a streaming data source in an event processing system.

In embodiments, the database data source may be implemented with a time increment policy which will automatically progress time on an enhanced event processing system side even in the absence of snapshot modifications. The policy can also further be used to drive pull-based update from the database data source. The database data source may allow initialization mode (similar to the rundown), when optional timestamp can be provided. Timestamps may not be required to be in any particular order in this mode. This operation can only be performed once before database data is ever used.

A constructed data stream, indicated in the code below as Reference Data or refData, may support an application programming interface (API) that allows for running operations using the constructed data stream. The API may be a CRUD (create, read, update and delete) interface where user can perform actions. An exemplary scenario in the code below may be associated an application service can be configured to collect logged error information from various devices to perform near-real time analysis. Each device may be identified by a device identifier (e.g., Machine_ID). It is contemplated the device identifier may be mapped to a corresponding device name and details (e.g., MachineName and MachineDetails). The mapping from the device identifier to the corresponding device name can be stored as metadata in a database table mapping of a plurality of device identifiers to device names. The API may in particular support a key-value store a table schema that implements temporal elements (e.g., transaction time as system time). By way of comparison below, an API with explicit time can be used for initialization of the constructed data stream.

```
var refData = new ReferenceData<int, MachineDetails>(new Uri("http://
..."));
refData.Add(1, new MachineDetails(machineId:1, machineName:"x",
domain:"A"));
refData.Add(2, new MachineDetails(2, "y", "A"));
refData.Update(1, new MachineDetails(1, "x2", "A"));
refData.Delete(2);
var refData2 = new ReferenceData<int, MachineDetails, long>
(new Uri("http://myRefData"));
refData2.Add(1, new MachineDetails(machineId: 1, machineName:
"x", domain: "A"), 1000);
refData2.Add(2, new MachineDetails(2, "y", "A"), 5000);
refData2.Update(1, new MachineDetails(1, "x2", "A"), 3000);
refData2.Delete(2, 5000);
refData2.Add(2, new MachineDetails(2, "yz", "ABC"), 4000);
refData2.Add(2, new MachineDetails(2, "y", "A"));
```

The time information is not retrieved in any particular order and the calls for time related information for the database data source can be mixed with normal API calls which will set time to current system time.

The constructed data stream API may implement step functions in that when no change exists between t1 and t2, the value at time t2 is the value at t1. The API can be used to read the value of a specific key at a given time:

```
refData2.MoveTimeTo(4500);
MachineDetails value = refData2.ReadAt(key: 2, time: 3500);   // (2, "y", "A")
value = refData2.ReadAt(key: 2, time: 4200);                   // null
```

It is contemplated that reading the constructed data stream after the last application time in the constructed data stream can be forbidden because it would lead to non-reproducible result. In the case of application time, a punctuation mechanism may be used to force time progression, move forward the application time, or to close the initialization phase and switch to system time. In the case of system time, embodiments herein can forbid reading after a current time, as discussed in more detail below.

```
Dictionary<int, MachineDetails> values = refData2.ReadAt(2500);   // {{1, (1, "x", "A")},
                                                                  // {2, (2, "y", "A")}}
```

The result is all the values that are locally known. Depending on the sharding/partitioning, this may be a subset of the reference data in the constructed data stream.

A streaming mechanism can be implemented to stream the constructed data stream. A basic read function (e.g., ReadAT) of the API may not adequately support temporal elements of the constructed data stream because it is necessary to know when the changes happen. The streaming mechanism utilizes the constructed data stream to create corresponding edge and interval events. The streaming mechanism includes the capacity to create edge events for each change: each change results in an edge end event with the former value and an edge start event with the new value.

The streaming mechanism also includes the capacity to know the initial state when the constructed data steam has to be streamed from a specific time, i.e., not from beginning of time.

Figure 6:
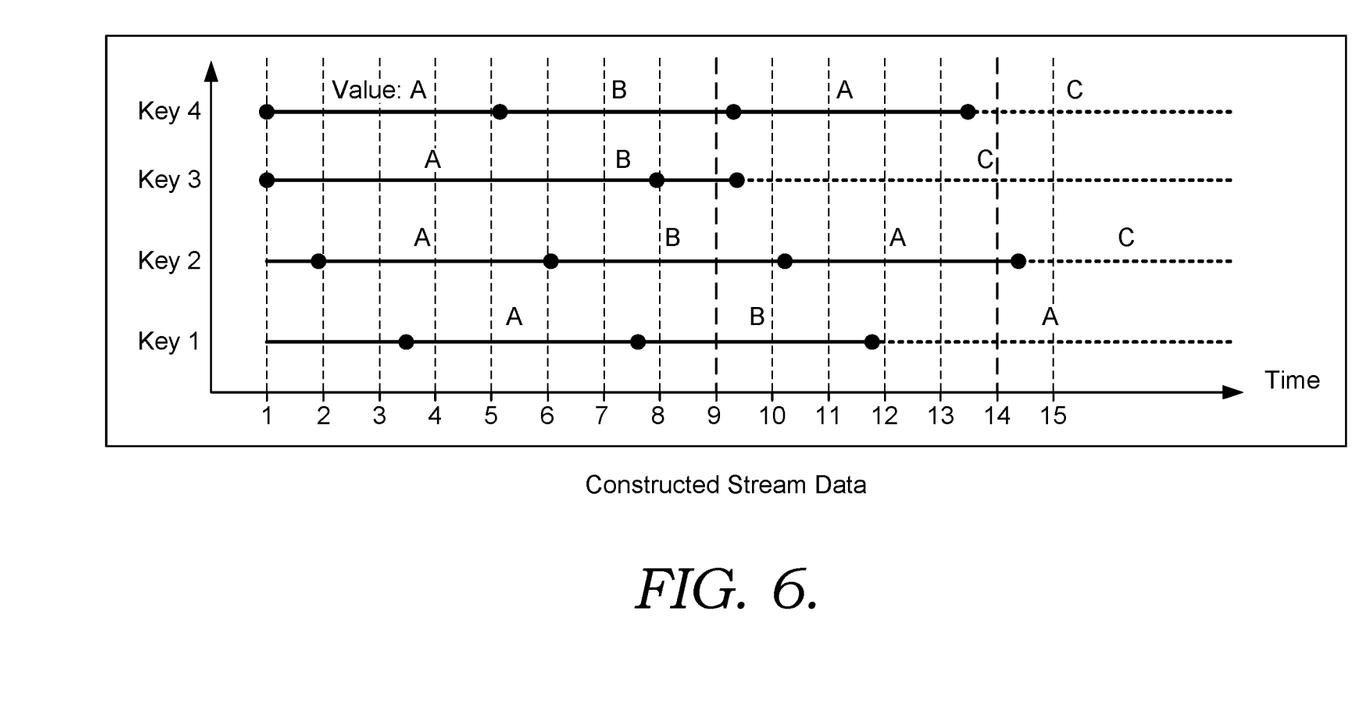
FIG. 6 is an exemplary illustration of constructed stream data in accordance with embodiments described herein.

Streaming changes corresponding to the constructed stream data, as shown in FIG. 6, from 9 to 14 should result in:
1) The initial "state" at time 9
    Timestamp: 5.2, key: 4, value: B
    Timestamp: 6.1, key: 2, value: B
    Timestamp: 7.5, key: 1, value: B
    Timestamp: 7.9, key: 3, value: B
2) The changes between 9 and 14
    Timestamp: 9.2, key: 4, value: A
    Timestamp: 9.3, key: 3, value: C
    Timestamp: 10.1, key: 2, value: A
    Timestamp: 11.8, key: 1, value: A
    Timestamp: 13.5, key: 4, value: C However, creating a stream of edge/interval events from this stream of changes would require keeping track of each key (last timestamp and last value) in order to create edge end events corresponding the former value. Storing and streaming changes as a pair of values (old and new) would make it easier:
1) The initial "state" at time 9
    (can be used to create one edge start events per change event)
    Timestamp: 5.2, key: 4, value: B, old: null
    Timestamp: 6.1, key: 2, value: B, old: null
    Timestamp: 7.5, key: 1, value: B, old: null
    Timestamp: 7.9, key: 3, value: B, old: null
2) The changes between 9 and 14
    (can be used to create one edge end event and one edge start event per change event)
    Timestamp: 9.2, key: 4, value: A, old: {value:B, since:5.2}
    Timestamp: 9.3, key: 3, value: C, old: {value:B, since:7.9}
    Timestamp: 10.1, key: 2, value: A, old: {value:B, since:6.1}
    Timestamp: 11.8, key: 1, value: A, old: {value:B, since:7.5}
    Timestamp: 13.5, key: 4, value: C, old: {value:A, since:9.2}

This stream is sufficient to create edge events corresponding to the constructed data stream. This will be used internally to expose the constructed data stream as a source that can be used by the enhanced event processing system.

```
IObservable<Change<int, MachineDetails, long>> observable = refData.
StreamChanges(fromTime:0, toTime: 5000);
```

-continued

```
observable.ForEachAsync(change => Console.WriteLine(string.Format(
    "time: {0}, key: {1}, oldValue: {2}, newValue: {3}",
    change.Time, change.Key,
    change.OldValue!=null ? change.OldValue.Domain + "\\" + change.
    OldValue.MachineName : "null",
    change.NewValue!=null ? change.NewValue.Domain + "\\" + change.
    NewValue.MachineName : "null")
));
```

It is contemplated that when streaming reference data from $t_1$ to $t_2$ and next from $t_2$ to $t_3$, the initial state at $t_2$ can be ignored. Either there is a way to not requested it or it is necessary to de-duplicated resulting edge start events.

The constructed stream data may further support an operator to join the constructed data stream with a stream of point events (e.g., data streams). By way of example code below

```
    var queryDef = ReferenceData.From(refData)
        .TemporalJoin(EventStream.From(stream),
        (ref, str) => ref.MachineId == ref.Id,
        (ref, str) => new { Id = str.Id, State = str.State, Name = ref.
        MachineName} )
        .To(sink);
    var query = ctx.StartQuery("q1", queryDef);
```

The parameters of the join are: 1) the stream, 2) the join predicate, 3) the result selector (i.e. a projection). The join predicate may be ignored or replaced by "(ref, str)=>true" when the stream and the reference data are already regrouped by the machine id.

It is contemplated that a bi-temporal join can be performed using the constructed data stream. For example, when reference data in a database is consumed as a constructed data stream using a streaming mechanism, a temporal element (e.g., timestamp) of the events can be used in a temporal join, and when the reference data in the database is consumed as a constructed data stream using a lookup mechanism, a different time line (e.g., another time in the payload of the event) could be used as a join condition.

The constructed data stream component 230 is configured to generate a constructed data stream using an identified database data source having database data that is utilized in enhanced event processing. It is further contemplated that an anticipated enhanced event processing request may determine and indicate in advance what database data is used in generating the constructed data stream. The database data used in constructing the constructed data stream can be a factor of the anticipated enhanced event processing requests to be made against the database data.

An enhanced event processing request includes a request for data in a database data component 220 which is actually accessed using a constructed data stream of the constructed data stream source component 230. The constructed data stream can act as a proxy to the database data component while simulating data stream features and functionality. It is contemplated that the constructed data stream may be defined as data type in an enhanced event processing system. The data type may be defined as a schema that determines how the constructed data stream is organized.

In operation, the constructed data stream may be generated based on a sampling mechanism that supports sampling a discrete instance of database data to create a snapshot of the database data. Sampling may be done for the entire database or only for an identified portion of the database data. Sampling may also be done particularly based on an expected enhanced event processing requests such that a value associated with the enhanced event processing request is preserved in a snapshot of the database.

In one embodiment, the constructed data stream source component 230 may implement a periodical sampling mechanism. The periodical sampling mechanism supports performing sampling at a predetermined or designated time interval. By way of example, database data may be sampled every five minutes. In another exemplary embodiment, the constructed data stream may be generated based on a differential sampling mechanism that supports sampling to generate differential snapshots of the database data. The differential snapshot indicates the change in the database data and not an entire snapshot of the database data. It is contemplated that differential sampling to generate different snapshots may be implemented to reduce to cost of storing entire snapshots of the database data. By way of example, a slow changing dataset may be ideal for differential sampling to create differential snapshots as changes are infrequent, as such, a differential snapshots capture any changes that may have occurred since. The snapshots of a constructed data stream support repeatability in that a query against the constructed data stream having the snapshots provide the same answer, while a query to the database data might provide a different answer as the data in a database changes over time.

The constructed data stream source component 230 may implement a subscription mechanism that receives notifications of changes in the database data. The notification of changes may be based on a notification mechanism implemented at database data source component 220 that uses an administrative temporal element to associate a change in the database data with a time of the changes. When a notification is received, the constructed data stream data component can sample the database data and associate the sampled database data with the time in the administrative temporal element. Sampling may be a full sample or differential sample as discussed above. In this regard, the sampling is not be based on a periodical mechanism but rather based on a notification of a change in the database data. In addition, the correctness of the output from an enhanced event processing request is improved, in that, the constructed data stream data accurately reflect changes in the database data unlike a periodical sampling mechanism.

The constructed data stream is advantageously flexible in that it can support different types of enhanced event processing logic associated with the constructed data stream, and can do so in a backwards compatible manner. The constructed data stream may utilize sampling to generate snapshot of database data. Sampling may be based on a periodical sampling mechanism, differential sampling mechanism. The constructed data stream provides for enhanced event processing with repeatability without having to alter the historical information or structure of the database data or the constructed data stream. The logic for generating output for enhanced event processing requests as described herein can be maintained with different sampling methods and even with changes to sampling methods. A request to the constructed data stream advantageously functions either way with the construction data stream of snapshot of the database data.

With continued reference to FIG. 2, the data stream source 240 is responsible for managing and providing access to a data stream. Data streams or streams of information may be, in particular, about events. Data stream data is associated with a temporal element that indicates when an event associated with the data occurred. Data streams may be listened to actively via a listener application. Data streams may also be temporarily stored for a short period of time (e.g., 5 minutes) or a long period of time (e.g., a year to several years) and replayed as if the data is being actively streamed. By way of example, an event processing request may be used to compare new streaming data to streaming data from a year before to derive conclusions from comparisons thereof. In this regard, data streams may be combined to perform tracking and analysis to derive outputs. Further a data stream may be included in an enhanced event processing request with database data, such that, the data stream is combined with a constructed data stream to generate an output for the enhanced event processing request.

The computing device 250 may include any type of computing device 100 described above with reference to FIG. 1, for example. The computing device 250 can provide access to different components described herein. In particular, the computing device 250 may access the enhanced event processing server 260 to perform one or more operations facilitated by the enhanced event processing server, as described further herein.

Enhanced event processing server 260 is responsible for managing enhanced event processing as described herein. The enhanced event processing server 260 accesses the constructed data stream as a collection of snapshots as a function of a selected value and time. The enhanced event processing server 260 may receive an enhanced event processing request. It is contemplated that the enhanced event processing request can be received via the computing device 250 or using a request service programmed to generate requests for systematic event processing. The enhanced event processing request can be processed based on whether the enhanced event processing request is associated with one or more database data sources or associated with both database data sources and data stream sources. In this regard, the enhanced event processing server 260 can correlate the data stream and the database data using a particular logic to derive output for the data. The enhanced event processing request may request an output based on inputs of tracked data in order to analyze the data to generate an inference. The output may be a conclusion derived from both the data in the data stream and the constructed stream data.

With continued reference to FIG. 2, the enhanced event processing server 260 may include several modules include a timing module 262, operations module 264, a logic module 266, and a validity time module 268. A timing module can implement a timing mechanism for processing events. In particular, the timing mechanism specifically identifies a temporal element and an expiration element associated with an event, where the temporal element indicates a time the event happened and the expiration element indicates when the event stopped being available. In this regard, the timing module 262 using the timing mechanism may support event processing based on how fast events arrive to quickly generate output based on the timing associated with received inputs Operations module 264 is responsible for managing operations that may be executed against the data stream, database data, constructed data stream, and any combination thereof. In particular, an event processing request may include an indication of input data from database data or may include a combination request that includes an indication of input data for database data and a data stream. A constructed data stream may act as a proxy of the database data, and as such allow for different types of operations to be performed using events associated with the constructed data stream and the database data.

Enhanced event processing requests can include temporal elements that would otherwise not be possible via direct access to database data. In this regard, the operations module 264 can support a query mechanism that is declarative to issue enhanced event processing data requests. A declarative query mechanism minimizes or eliminates how of the operations should work and supports more of what the operations should achieve. For example, a user may enter a simple join operation to join a data stream with reference data from a database table using a constructed data stream, in the same manner as joining two traditional database tables.

By way of example, assume a stream of events corresponding chemical analysis done by different instruments:

| UseCase1_stream | | |
|---|---|---|
| Assay_time | Chem_id | Instrument_id |
| 8:10 am | 1 | 1 |
| 8:20 am | 1 | 2 |
| 8:30 am | 2 | 1 |
| 8:40 am | 3 | 2 |

In order to know how many tests of a given type (e.g. H1AC) have been done, it is necessary to annotate the events with a name (mapping id—name is in reference data). So assume that the following snapshot is valid from 8:00 am to 9 am.

| Chem_Id | Name | Description |
|---|---|---|
| 1 | H1AC | Hemoglobin A1c test for diabetes |
| 2 | Xyz | xyz test |
| 3 | Abc | abc test |

In order to replace the chem_id by a name, the query could be:

```
1  SELECT System.Timestamp AS Assay_time, stream.Chem_id, map.
   Name AS Chem_name,
2       stream.instrument_id
3  FROM Timestamp(UseCase1_stream, Assay_time) stream
4  JOIN UseCase1_mapping map
5      ON stream.Chem_id = map.Chem_Id
```

The resulting stream with names would be:

| Assay_time | Chem_id | Chem_name | Instrument_id |
|---|---|---|---|
| 8:10 am | 1 | H1AC | 1 |
| 8:20 am | 1 | H1AC | 2 |
| 8:30 am | 2 | Xyz | 1 |
| 8:40 am | 3 | Abc | 2 |

Advantageously, generating enhanced event processing requests is consistent with existing declarative query mechanism, and maintains an intuitive approach for generating outputs from identified inputs. As such, the enhanced event processing features are transparent to a user submitting a query or an operation to the operations component. The operations module 264 may also execute enhanced event processing request based at least in part on a validity time mechanism as discussed in more detail below.

The logic module 266 is responsible for managing the particular method of enhanced event processing based on the structure of the constructed data stream. As discussed above, the constructed data stream may be based on sampling that generates snapshots of the database data using either periodical sampling or differential sampling. The sampling method informs the logic of the logic module 266 for generating outputs based on inputs. The particular type of data also affects the logic that may be used in generating outputs.

In one embodiment, the logic module 266 may implement a selected logic, such that, operations received via the operations module 264 are executed using the selected logic. A most up-to-date snapshot logic utilizes a collection of snapshots including the most up-to-date snapshot to perform operations associated with an enhanced event processing request. In this regard, the database data in available up to a given snapshot in the constructed data stream and operations are performed using the collection of snapshots up to the most-up-to data snapshot.

In another exemplary embodiment, the logic module 266 may implement an interpolation logic that supports approximating a value of the constructed data stream given values from two snapshots of the constructed data stream. The interpolation logic can generate an intermediate value for particular types of variable data types but not others (e.g., temperature but not customer address). In operation, a sampling mechanism (e.g., periodical or differential) may include a first value (e.g., 70° F.) at a first time (e.g., 5:00 pm) and a second value (e.g., 73° F.) at a second time (e.g., 5:05 pm). The interpolation logic is configured to approximate an intermediate value (e.g., 70° F. and 73° F.) as a potential actual value if an enhanced event processing request queried for the temperature at an intermediate time (e.g., 5:03 pm). It is contemplated that the interpolation mechanism may explicitly indicate that the resulting output is based on an interpolation and not actual input data from the constructed data stream.

Advantageously, the logic module 266 may implement changing logic selections (e.g., from most up-to-date snapshot to interpolating logic or vice versa) with the constructed data stream being backwards compatible to support any change in the logic. In other words, the nature of the constructed data stream supports a change in the logic of generating output data from the constructed data stream without reconstructing the constructed data stream itself. By way of example, database data having reference data that is accessed either as a data stream or a using a look up mechanism may be accessed based on a different logic, at a well-defined point in time. Specifically, the reference data can be a temperature reading taken every minute, on the minute. The constructed stream data is a function of the last temperature reading value taken (e.g., most up-to-data snapshot logic). Accordingly, a step function is produced. In the event that at a different point in time (e.g., designated logic change time), the logic is changed to a linear interpolation logic, the constructed data stream query can be associated with a most up-to-date snapshot logic up to the designated logic change time and then a linear interpolation logic can be used for values after the designated logic change time. Such a statement does not impact the reference data accumulated in the past, thus does not require any require any recalculation, and accordingly the constructed data stream is backwards compatible.

With continued reference to FIG. 2, a validity time module 268 is responsible for indicating un-contradicted outputs for enhanced event processing requests. In particular, the validity time module 268 implements a validity time mechanism that indicates a validity temporal element for outputs associated with constructed data stream. The validity time mechanism provides routines and procedures for indicating un-contradicted outputs for enhanced event processing requests. Specifically, the validity temporal element indicates a time where the output based on one or more data sources accurately reflects the data in the data sources at the time executed. The nature of the constructed data stream is such that it may accurately reflect the database data only up to a certain time before one or more mechanisms discussed herein are used to update the constructed data stream. The capacity of constructed data stream to reflect the most up-to-date data in the database is a function of sampling and in particular, a sampling mechanism utilized. As such, requests are valid only up to the time (e.g., valid temporal element) of the last snapshot of the constructed data stream data. Other limitations (e.g., latency) may make the delay the most up to date information, even for data stream data.

It is contemplated that the validity time module 268 may communicate the validity time for an operation to the operations module such that the operations module may wait for all event data (actual data streams or constructed data streams) to arrive prior sanctioning the validity of a request. It is further contemplated that the given a validity time indicated using the validity module 268, the operation module 264 may prevent running a request having a time in the request which the output would not be associated with a validity temporal element. In embodiments, the operations module 264 can run the request and provide output but associate the output with the most recent validity temporal element such that it is known that the request is valid only up to the time of validity temporal element.

In embodiments, the validity time may be accelerated using the validity time module 268. Circumstances (e.g., system failures or latency) surrounding an event processing system may delay access to database data for updating a constructed data stream. In order to continue event processing, the validity time module may indicate a new validity temporal element associated with a constructed data stream event when sampling to generate snapshots of database data has not been performed to support the validity temporal element. As such, the validity time module 268 may sacrifice the accuracy of the constructed data stream in order to advance enhanced event processing requests.

Figure 3:
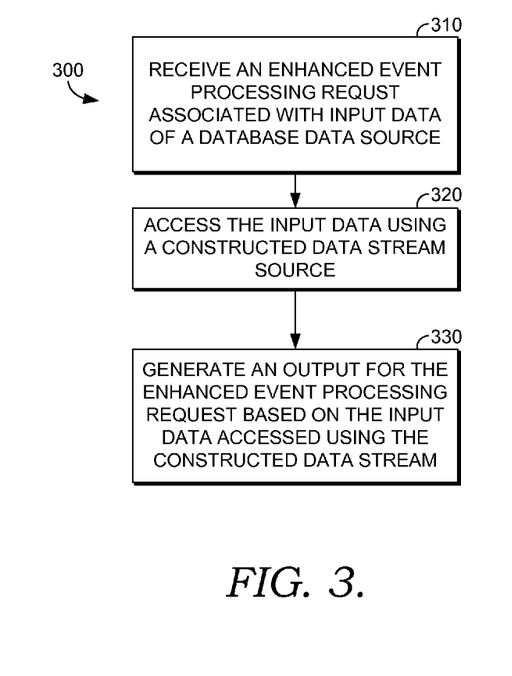
FIG. 3 is a flow diagram showing an exemplary method for performing enhanced event processing, in accordance with embodiments described herein.

Referring now to FIG. 3, a flow diagram is shown that illustrates an exemplary method 300 for performing enhanced event processing. Although the terms "step" and/or "block" may be used herein to connote different elements of methods employed, the terms should not be interpreted as implying any particular order among or between various steps herein disclosed unless and except when the order of individual steps is explicitly described.

At block 310, an enhanced event processing request is received. The enhanced event processing request comprises an indication of input data from a database data source. The input data form the database data source is not associated with a temporal element for the input data. At block 320, the input data in the indication of input data is accessed using a constructed data stream source. The constructed data stream source provides access to a collection of snapshots over time. The snapshots are of the database data of the database data source. The input data is accessed using the constructed data stream that comprises a temporal element. The temporal element indicates a time when an event associated with input data occurred. The temporal element of the constructed data stream is determined from a time an event of the constructed data stream occurred and stored as part of a snapshot of the event in the database data. At block 330, an output for the enhanced event processing request is generated based on the input data accessed using the constructed data stream. The output is associated with a validity temporal element that indicates a time where the output based on the constructed data stream accurately reflects data in the database data.

Figure 4:
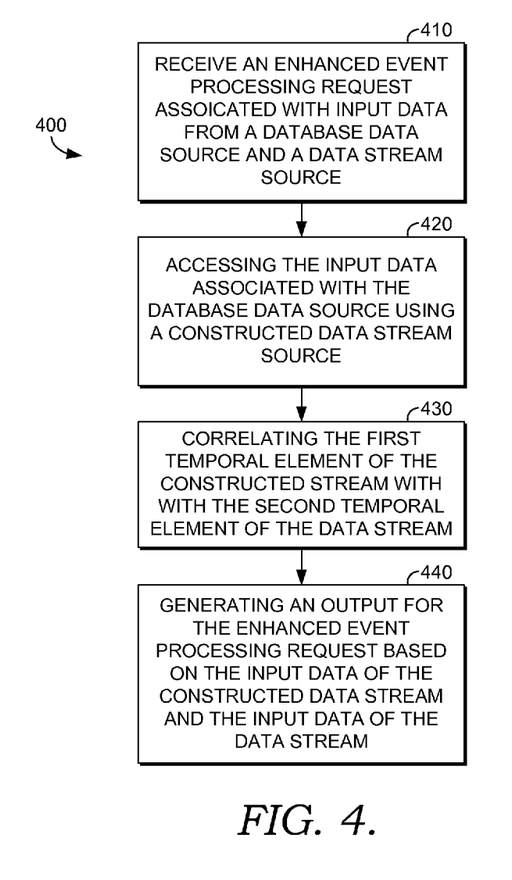
FIG. 4 is a flow diagram showing an exemplary method for performing enhanced event processing, in accordance with embodiments described herein.

Turning now to FIG. 4, a flow diagram that illustrates an exemplary method 400 for performing enhanced event processing. At block 410, an enhanced event processing request is received. The enhanced event processing request comprises an indication of input data from a database data source and a second indication of input data from a data stream source. At block 420, the input data in the indication of input data is accessed using the constructed data stream source. The constructed data stream source provides access to a collection of snapshots, of database data of the database data source, over time. The input data is accessed using the constructed data stream that comprises a first temporal element.

At block 430, input data in the second indication of input data is accessed using the data stream source. At block 440, the first temporal element of the constructed data stream is correlated with a second temporal element of the of the data stream. At block 450, an output for the enhanced event processing request based on the input data of the constructed data stream and the input data of the data stream is generated.

Figure 5:
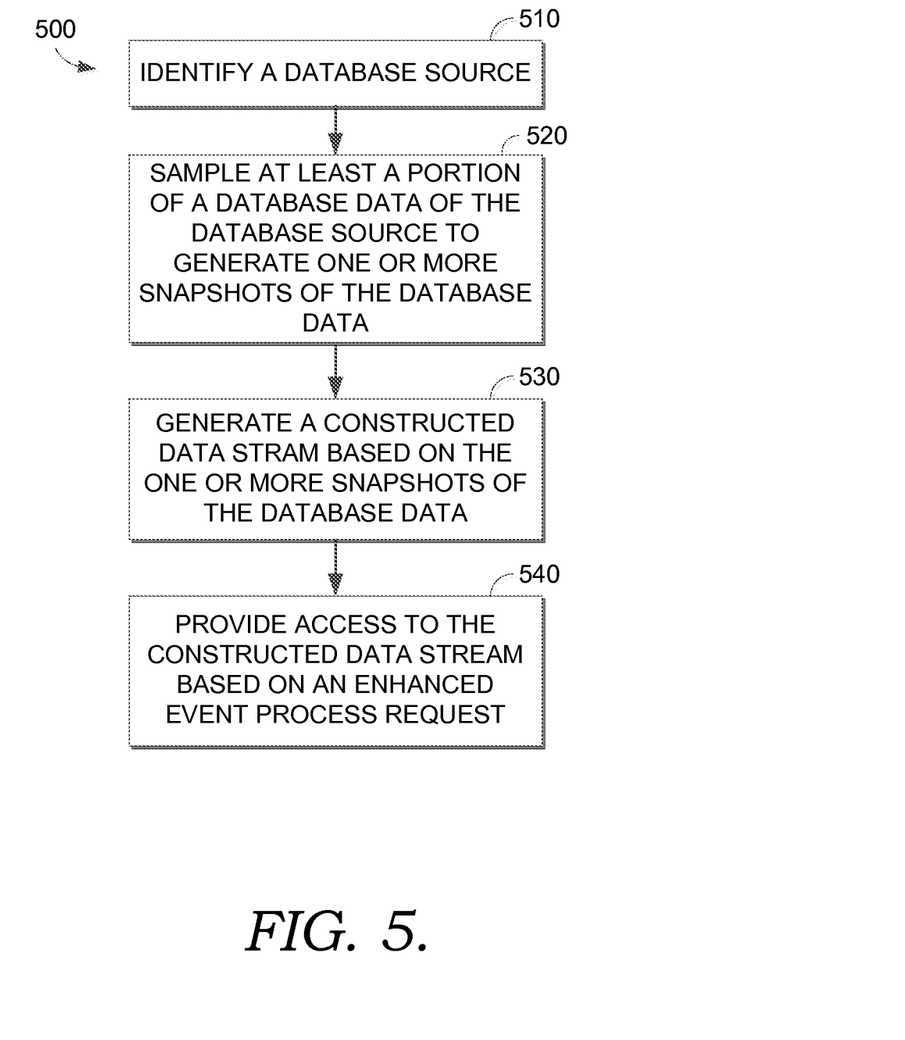
FIG. 5 is a flow diagram showing an exemplary method for performing enhanced event processing, in accordance with embodiments described herein.

Turning now to FIG. 5, a flow diagram that illustrates an exemplary method 500 for performing enhanced event processing. At block 510, a database data source is identified. The database data source is associated with database data. Database data includes reference data. At block 520, at least a portion of a database data of the database data source is sampled to generate one or more snapshots of the database data. Sampling the database data is based on a periodical sampling mechanism that generates one or more snapshots based on a predetermined time interval or a differential sampling mechanism that generates one or more snapshot that includes only the changes to the database data.

Sampling may further be based on a notification mechanism that indicates when a change to the database data has occurred such that a snapshot is generated upon an indication of a change to the database data. The notification mechanism can include a batching feature, the batching feature determines a predetermined number changes or determines a predetermined period of time before triggering a notification to perform sampling. The notification system can be based on an administrative temporal element that is associated with operation-based functionality of the database data, the administrative temporal element is not recorded in the database. The administrative temporal element indicates a time that is associated with snapshot that are used to generate the constructed data stream with a temporal element.

At block 530 constructed data stream based on the one or more snapshots of the database data, wherein the constructed data stream is associated with a temporal element. At block 540, access to the constructed data stream is provided based on an enhanced event processing request; the enhanced processing event request is associated with an indication of input data in a database of the database data source accessible using the constructed data stream.

Embodiments of the presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for enhanced event processing, the method comprising:
    receiving an enhanced event processing request, wherein the enhanced event processing request comprises an indication of input data from a database data source;
    accessing the input data in the indication of input data using a constructed data stream source, wherein the constructed data stream source provides access to a collection of snapshots, of database data of the database data source, over time, wherein the input data is accessed using the constructed data stream that operates as a data stream simulation proxy for the database data source, the constructed data stream is constructed from the collection of snapshots such that the constructed data stream comprises a temporal element that indicates a time corresponding to an event of the constructed data stream; and
    generating an output for the enhanced event processing request based on the input data accessed using the constructed data stream.

2. The method of claim 1, wherein the input data from the database data source is not associated with a temporal element for the input data in that the database data source maintains database data in relational database tables.

3. The method of claim 1, wherein the input data in the enhanced event processing request corresponds to a selected value and a selected time in a selected snapshot in the collection of snapshots that is accessed via the constructed data stream.

4. The method of claim 1, wherein the temporal element of the constructed data stream is determined from the time an event of the constructed data stream occurred and stored as part of a snapshot of the event in the database data.

5. The method of claim 1, wherein the constructed data stream provides for repeatable computations using the database data that changes over time, and wherein the constructed data stream is accessed as a function of a selected value and a selected time.

6. The method of claim 1, wherein the enhanced event processing request further includes a second indication of input data from a data stream.

7. The method of claim 6, further comprising:
    correlating a first temporal element of the constructed data stream with a second temporal element of the data stream; and
    generating an output for the enhanced event processing request based on the input data of the constructed data stream and the input data of the data stream.

8. The method of claim 1, wherein the output is associated with a validity temporal element that indicates the time where the output based on the constructed data stream accurately reflects data in the database data.

9. One or more computer storage media having computer-executable instructions embodied thereon that, when executed, by one or more processors, causes the one or more processors to perform a method for enhanced event processing, the method comprising:

identifying a database data source;

sampling at least a portion of a database data of the database data source to generate one or more snapshots of the database data;

generating a constructed data stream based on the one or more snapshots of the database data, wherein the constructed data stream is associated with a temporal element; and providing access to the constructed data stream based on an enhanced event processing request; wherein the enhanced processing event request is associated with an indication of input data in a database of the database data source accessible using the constructed data stream.

10. The media of claim 9, wherein sampling the database data is based on a periodical sampling mechanism that generates one or more snapshots based on a predetermined time interval.

11. The media of claim 9, wherein the sampling the database data is based on a differential sampling mechanism that generates one or more snapshots that include only the changes to the database data.

12. The media of claim 9, wherein sampling the database is based on a notification mechanism that indicates when a change to the database data has occurred such that a snapshot is generated upon an indication of a change to the database data.

13. The media of claim 12, wherein the notification mechanism further comprises a batching feature, wherein the batching feature determines a predetermined number of changes or determines a predetermined period of time before triggering a notification to perform sampling.

14. The media of claim 12, wherein the notification mechanism is based on an administrative temporal element that is associated with operation-based functionality of the database data, wherein the administrative temporal element is not recorded in the database.

15. The media of claim 14, wherein the administrative temporal element indicates a time that is associated with snapshots that are used to generate the constructed data stream with the temporal element.

16. A computer system for performing enhanced event processing, the computer system comprising:

a database data source component configured for:

providing access to a database data;

a constructed data stream source component configured for:

identifying a database data source;

sampling at least a portion of a database data of the database data source to generate one or more snapshots of the database data;

generating a constructed data stream based on the one or more snapshots of the database data, wherein the constructed data stream is associated with a temporal element; and providing access to the constructed data stream based on an enhanced event processing request, wherein the enhanced processing event request is associated with at least an indication of input data in the database of the database data source accessible using the constructed data stream;

a data stream source configured for:

providing access to a data stream; and an enhanced event processing server configured for:

receiving the enhanced event processing request, wherein the enhanced event processing request comprises an indication of input data from the database data source and a second indication of input data from the data stream source;

accessing the input data in the indication of input data using the constructed data stream source, wherein the constructed data stream source provides access to a collection of snapshots, of database data of the database data source, over time, wherein the input data is accessed using the constructed data stream that comprises a first temporal element;

accessing input data in the second indication of input data using the data stream source;

correlating the first temporal element of the constructed data stream with a second temporal element of the data stream; and generating an output for the enhanced event processing request based on the input data of the constructed data stream and the input data of the data stream.

17. The system of claim 16, wherein the enhanced event processing server comprises a logic module, wherein the logic module is configured for:

identifying a logic for generating output based on the enhanced event processing request, wherein the logic is selected from at least one of a:

most up-to-date snapshot logic; and interpolation logic; and providing the logic such that the output is generated based on the logic, wherein the logic is backwards compatible with the constructed data stream.

18. The system of claim 16, wherein the enhanced event processing server comprises an operations module, wherein the operations module is configured for:

receiving the enhanced event processing request with an indication of input data in a database, the input data is not associated with a temporal element; and accessing the input data using a constructed data stream, wherein the constructed data stream comprises the input data associated with a temporal element.

19. The system of claim 16, wherein the enhanced event processing server comprises a validity time module, wherein the validity time module is configured for:

providing a validity temporal element that indicates a time where the output based on the constructed data stream accurately reflects data in the database data.

20. The system of claim 19, wherein the validity temporal element is accelerated to advance processing of enhanced event processing requests.

* * * * *